Aug. 13, 1968     W. SCHRAUB     3,397,102
METHOD OF MAKING GUIDING MEANS FOR MACHINE CARRIAGES
Original Filed March 23, 1964
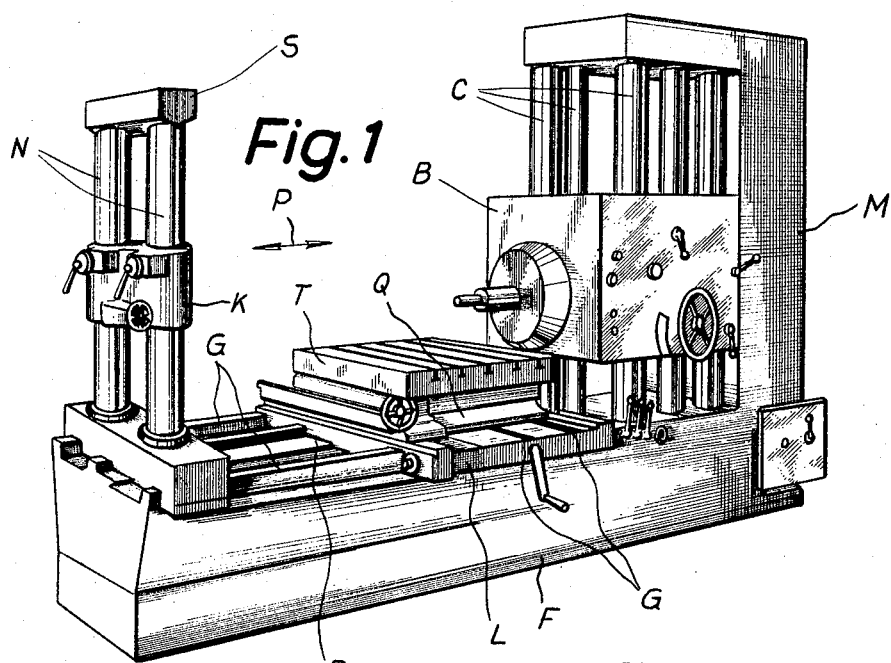
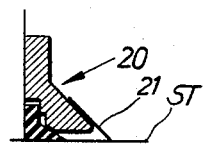
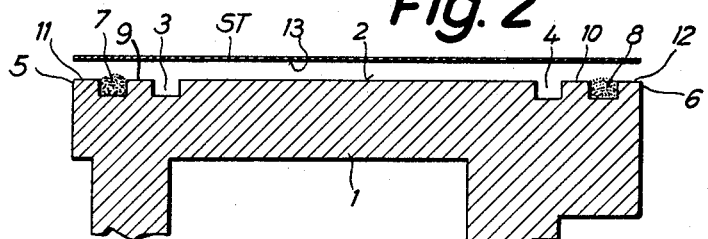
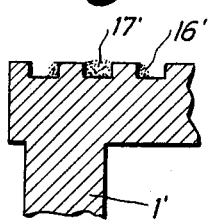
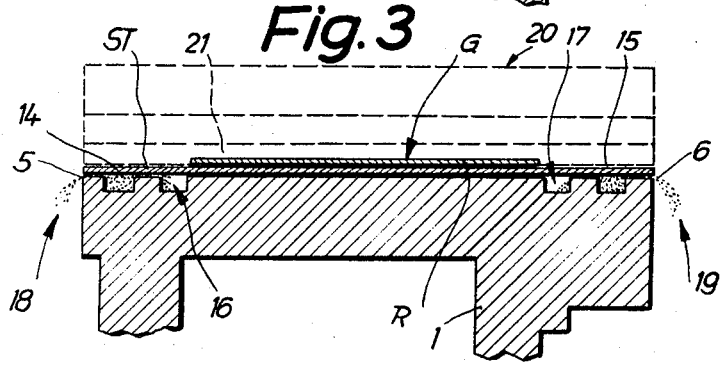

United States Patent Office

3,397,102
Patented Aug. 13, 1968

3,397,102
METHOD OF MAKING GUIDING MEANS FOR MACHINE CARRIAGES
Willy Schraub, Beckrath-Wickrath (Niers), Germany, assignor to Scharmann & Co., Rheydt, Rhineland, Germany
Original application Mar. 23, 1964, Ser. No. 353,769, now Patent No. 3,311,425, dated Mar. 28, 1967. Divided and this application Dec. 1, 1966, Ser. No. 598,415
Claims priority, application Germany, July 5, 1963, Sch 33,584
4 Claims. (Cl. 156—257)

ABSTRACT OF THE DISCLOSURE

A method of providing a planar portion of a supporting and guiding member with a planar guiding surface for supporting and guiding the movement of a movable member which includes the steps of forming grooves along the said planar portion of said guiding member parallel to the length of the band and on opposite sides of said central portion of the band, but inwardly from the side edges of said band, placing an adhesive in said grooves in an amount in excess of the capacity of the grooves so that the adhesive protrudes from the top of the grooves, and displacing the adhesive laterally of the grooves by pressing said band on said planar portion of said guiding member.

The present application is a division of my copending application Ser. No. 353,769, filed Mar. 23, 1964, and now U.S. Patent 3,311,425.

The present invention relates to guiding means for machine tool parts, especially for carriages, and also concerns a method of making such guiding means.

Guiding means in the form of guiding tracks for machine tool parts, especially carriages, are known, in which a steel band or strap is clamped over the guiding member and connected thereto. It is on this steel band or strap that the movable machine part slides, usually on a sliding strip or foil, generally, of bronze.

With heretofore known arrangements of such tracks, the steel band is placed directly upon the guiding member and is grasped at its lateral edges by steel clamping strips which, by means of screws, are screwed to that portion of the guiding member which extends beyond the width of the steel band.

With this heretofore known arrangement, it is necessary to provide the guiding member with threaded bores for receiving the connecting screws which extend through the lateral steel strip. Furthermore, it has been found that gaps can form between the guiding member and the steel strips, and that chips can enter said gap. It has, in fact, proved difficult fully to cover the said gap so that chips will be prevented from entering the same. Even when employing a stripper, it is difficult to keep the gap free from chips and from oil and drilling emulsions, all of which detract from the flatness of the steel strip.

It is also known to cement machine parts together, but it has not heretofore been the case that such steel strips were cemented in place.

It is an object of the present invention to provide a method of making guiding means for machine tools according to which a steel band or strap is arranged in taut condition above the guiding or supporting member and is connected thereto, while avoiding the drawbacks of heretofore known guiding means of this general type.

It is another object of this invention to provide a method as set forth in the preceding paragraph, which will make superfluous a post-grinding or an additional or post-machining of the guiding member or sections of the steel strap.

It is another object of this invention to provide a method as set forth in the preceding paragraph, according to which the steel strips or straps will be and will remain completely planar.

Still another object of this invention consists in a method of making guiding means which will prevent the collection of chips, oil or drilling emulsions at undesired places beneath the steel strip of the guiding means.

Still another object of this invention consists in providing a method of making guiding means as set forth above in a simple but highly effective manner.

These and other objects and advantages of the invention will appear more clearly from the following specification in connection with the accompanying drawings, in which:

FIGURE 1 illustrates the arrangement of a guiding member according to the present invention in connection with a horizontal drilling or a milling machine;

FIGURE 2 shows the condition of the guiding member and of the steel band prior to the interconnection of both parts;

FIGURE 3 shows the steel band connected to the guiding member;

FIGURE 4 illustrates a stripper of standard design employed in connection with the present invention; and FIGURE 5 shows one side of a modified guiding member made according to the present invention.

The above-mentioned objects have been realized according to the present invention by providing the guiding or supporting member at its lateral portions with one or more grooves extending in the longitudinal direction, and by cementing the lateral edges of the steel band or strip or strap between the grooves and the adjacent side wall portion to the guiding member. The intermediate section of the steel band below the sliding surface of the movable machine part will thus be free from cement substance so that after applying a corosion protective coating to the bottom side of the steel band and to the guiding member over the width of the sliding foil of the movable machine part, the band or strip will directly engage and be supported by said guiding member. In this way, a completely planar sliding surface of the steel band will be obtained while the space between the band and the guiding member laterally of said sliding surface will be covered completely so that no spaces will be formed in which chips, oil or drilling emulsions could collect. The steel band can easily be kept free from impurities inasmuch as a stripper on the member slidable on the band may work over the entire width of the steel strap.

The distance between the longitudinal grooves or, when employing a plurality of grooves on each longitudinal side of the guiding members, the distance between the inner longitudinal grooves, is at least as great, as the width of the sliding foil of the movable machine part.

Preferably, each longitudinal side of said guiding members is provided with at least two grooves in which the outer groove is spaced an equal distance from the longitudinal side of the guiding member and from the inner groove.

When employing the method according to the invention for making such guiding means, provision is made that one groove of each longitudinal side of the guiding member is provided with a liquid or pasty adhesive extending above the surface of the guiding member. Furthermore, the marginal portions of the steel strap are pressed upon the marginal portions of the guiding member. In this way, the adhesive extending above the surface of the guiding member is displaced laterally on the surface of the guiding member. When provided with a plurality of grooves at each longitudinal side of the guiding member, due to the fact that the outer groove is spaced from the inner groove and from the longitudinal edge of the guiding member by the same distance, a uniform escape path toward both sides of the outer groove is obtained for the adhesive which protrudes beyond the surface of the guiding member. In other words, a uniform distribution of the excessive quantity of adhesive to both sides of the outer groove will be obtained at each longitudinal side of the guiding member and thus there will also be obtained a completely uniform gluing or cementing effect. The inner groove, in that case, forms a stop to prevent any cement from getting under the center portion of the steel band.

As adhesive may be selected substances which have a surface tension by means of which a convex liquid surface is formed. These adhesives include also the multiple component adhesives.

Referrring now to the drawings in detail, in FIGURE 1 it will be noted that the top surface of the box-shaped frame F is provided with tracks G for the longitudinal carriage L, which guiding tracks are arranged between the main standard or column M and the auxiliary standard or column S. A transverse carriage Q is slidably arranged on the longitudinal carriage L, said transverse carriage Q carrying the setting table T. Also, the transverse carriage may be provided with guiding tracks G. The guiding tracks so referred to are composed primarily of guiding support member 1 and steel band or steel strap ST (FIGURE 2).

The guiding member 1 has a planar central surface section 2 which is confined by two grooves 3, 4 extending in longitudinal direction of the guiding member 1 near the lateral edges 5 and 6. Between said grooves 3 and 4 and said lateral edges 5 and 6 there are provided further grooves 7 and 8 which are parallel to grooves 3 and 4 and preferably, but not necesarily, have the same cross-section as said grooves 3 and 4. Grooves 3, 7 and 4, 8 near the longitudinal edges 5 and 6 of the guiding member 1 form therebetween a planar supporting surface 9 and 10 respectively, which is located at the same level as surface 2. Similar supporting surfaces 11, 12 are provided between the grooves 7 and 8 and the longitudinal edges 5 and 6. Grooves 7 and 8 are filled with a liquid or pasty adhesive, preferably a multiple component adhesive. This adhesive is shown in FIGURES 2 and 3 in grooves 7 and 8. The quantity of adhesive in grooves 7 and 8 is selected so that the free surface of the adhesive has an upwardly directed convex surface.

After part 2 of the top surface of guiding member 1 and the bottom side 13 of steel band ST has been provided with a corrosion protective coating over the width between grooves 3 and 4, the steel band ST is pressed upon the guiding member 1. In this way, the lateral marginal portions 14 and 15 of the steel band will press upon the adhesive in grooves 7 and 8 so that the excessive quantity of adhesive, i.e., the adhesive protruding beyond the surfaces 9 to 12, will be displaced laterally whereby the said cement will be uniformly distributed over the surfaces 9 to 12. That portion of the adhesive which is pressed beyond the edge of the surfaces 9 to 12 will pass either into grooves 3, 4, as indicated by the dots at 16, 17 and 18, 19, or over the side edges 5, 6. The intermediate surface section 2 of the guiding member 1 will, however, remain free from adhesive. Thus, the support of the steel band ST by the intermediate portion of the guiding member 1 will not be affected by said application of adhesive. The band will rest flat on the guiding member 1 within the said intermediate section.

The thus supported bands form guideways for moveable parts. In FIGURE 1 the guideways G on bed F support carriage L, while guideways G on carriage L support carriage Q.

When employing a stripper 20 known per se, as it is illustrated in FIGURE 3, connected to the carriage 1, the stripper plate 21 connected to the stripper body will slide over the entire width of the steel band, as shown in FIGURE 3 in dish lines. The steel strip ST on which the sliding foil R of the carriage slides will thus be kept free from impurities over its entire surface.

Surface 2, which is that part of the planar top surface of the support member between the innermost grooves 3 and 4, referably has such a width that it corresponds to that of foil R.

The strap or band does not necessarily have to be made of steel, but can be made also of other metal suitable for the purpose involved.

Furthermore, it is to be noted that the term "steel strap" not only covers a straight strap but also a curved one.

It is, of course, to be understood that the present invention is, by no means, limited to the particular construction shown in the drawing, but also comprises any modifications within the scope of the appended claims.

What is claimed is:

1. In a method of providing a planar portion of a supporting and guiding member with a planar guiding surface for supporting and guiding the movement of a movable member according to which a band is arranged in taut condition above the supporting and guiding member and is connected thereto, which includes the steps of: forming grooves along the said planar portion of said guiding member parallel to the length of the band and on opposite sides of said central portion of the band, but inwardly from the side edges of said band, placing an adhesive in said grooves in an amount in excess of the capacity of the grooves so that the adhesive protrudes from the tops of the grooves, and displacing the adhesive laterally of the grooves by pressing said band on said planar portion of said guiding member.

2. A method according to claim 1, which includes forming a stop groove in said guiding member parallel to said first mentioned grooves and between each first mentioned groove and the said central portion of said band and into which the adhesive from said first mentioned grooves can overflow when said band is pressed on said guiding member thereby preventing any adhesive from getting onto said central portion of said band.

3. A method according to claim 2, in which said stop grooves are spaced apart by a distance about equal to the width of the part of said moveable member that engages said band.

4. A method according to claim 2, which includes the step of providing the surface region of said guiding member between said inner grooves and the contiguous surface of said band with a corrosion resistant coating on said surface.

References Cited
UNITED STATES PATENTS

| | | | |
|---|---|---|---|
| 2,707,694 | 5/1955 | Standring | 156—295 X |
| 2,744,846 | 5/1956 | Stickles | 156—291 X |
| 3,176,353 | 4/1965 | Pilliod et al. | 156—295 X |
| 3,350,249 | 10/1967 | Gregoire | 156—291 X |
| 3,355,341 | 11/1967 | Bertsche | 156—295 |
| 3,355,342 | 11/1967 | Lanman | 156—298 X |

HAROLD ANSHER, *Primary Examiner.*